United States Patent [19]

Bateman et al.

[11] 4,179,040
[45] Dec. 18, 1979

[54] STORAGE AND SERVING CONTAINER OR THE LIKE

[75] Inventors: Robert F. Bateman, Greenville; Jack V. Croyle, North Providence, both of R.I.

[73] Assignee: Dart Industries Inc., Los Angeles, Calif.

[21] Appl. No.: 933,003

[22] Filed: Aug. 11, 1978

[51] Int. Cl.² ............... B65D 25/10; B65D 25/28
[52] U.S. Cl. ................... 220/410; 206/804; 220/93; 220/94 A
[58] Field of Search ............... 220/410, 408, 23, 83, 220/411, 412, 413, 93, 18, 94 A, 68, 22, 22.3, 306, 355; 206/514, 804, 201, 203

[56] References Cited

U.S. PATENT DOCUMENTS

| 1,152,308 | 8/1915 | Evans | 220/408 |
|---|---|---|---|
| 1,846,540 | 2/1932 | Brown | 220/412 X |
| 2,081,078 | 5/1937 | Watson | 220/22.3 |
| 2,252,654 | 8/1941 | Webber | 220/93 X |
| 2,257,569 | 9/1941 | McCarthy | 220/23.83 X |
| 2,334,595 | 11/1943 | Bailey | 220/93 |
| 2,714,443 | 8/1955 | Kuvin | 220/22 X |
| 2,743,836 | 5/1956 | Roberts | 220/408 |
| 2,904,205 | 9/1959 | Callery | 220/93 X |
| 2,941,660 | 6/1960 | Tupper | 229/43 |
| 2,983,369 | 5/1961 | Rogouin | 206/804 X |
| 3,004,657 | 10/1961 | Hyman | 220/410 X |
| 3,155,267 | 11/1964 | Swett | 220/408 X |
| 3,237,549 | 3/1966 | Pospischil | 220/410 |
| 3,249,250 | 5/1966 | McKee | 426/115 X |
| 3,363,749 | 1/1968 | Tinapple | 206/320 |
| 3,380,592 | 4/1968 | Arnold | 210/244 |
| 3,416,689 | 12/1968 | Greenfield | 215/100 R |
| 3,458,078 | 7/1969 | Skidmore | 206/804 X |
| 3,720,346 | 3/1973 | Cypher | 220/22.3 |
| 3,759,416 | 9/1973 | Constantine | 220/70 X |
| 3,837,526 | 9/1974 | Medendorp | 220/306 |

Primary Examiner—Allan N. Shoap

[57] ABSTRACT

A container having a slidable article-removing internal insert which consists of a tray and a projecting handle that is so constructed to be guided for unobstructable movement within the container receptacle. Moreover, the means for such guided movement is incorporated into the handle arrangement of the insert in a fashion that positively restrains the insert for virtually the whole extent of its travel in the receptacle.

11 Claims, 7 Drawing Figures

STORAGE AND SERVING CONTAINER OR THE LIKE

This invention relates to a storage and serving container and more particularly to a container adapted to provide for the storage and easy removal of relatively small diameter food articles, such as onions, cherries, pickles and the like from the brine or juice in which they are maintained on the insert shelf.

The primary object of the invention is the provision of an efficient, simple, inexpensive, and adequately rugged device of the character indicated, which embodies structural provisions for (a) positively guiding the slidable article-supporting and removing insert when the device is elevated in a container to provide access to the contents thereof; (b) adequate drainage of fluid present in the container as the device is elevated; and (c) prevention of retained articles falling back into the container as the device is elevated.

Another object of the invention is the provision of a sanitary and non-corrosive device of the character indicated above, which a adapted to be economically and efficiently made, in one piece, from easily worked suitable materials, such as solid plastic or plastic coated materials.

Figure 1:
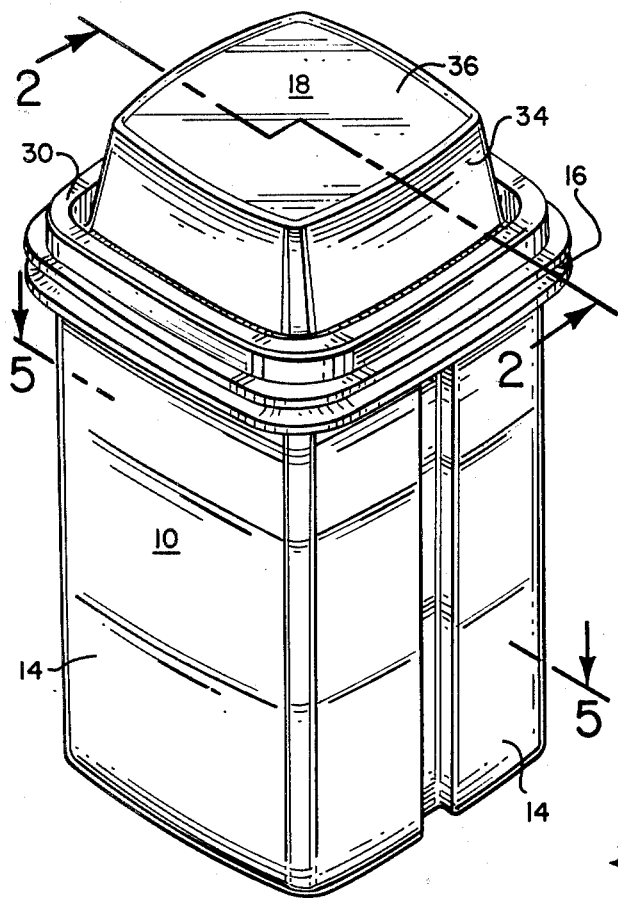
FIG. 1 is a perspective view of the closured container of this invention.

Referring in detail to the drawings, there is shown a receptacle 10 having a substantially planar bottom wall portion 12, and side wall members 14 provided, around their upper ends with flanged rim 16, onto which a closure 18 is adapted to be pressed. The receptacle 10, in accordance with the present invention, provides a substantially straight side wall structure 14 with an open upper end 20, that is of the approximate size of the bottom wall portion 12 thereof. The receptacle 10 need not be rectangular, as shown, but can be of any suitable cross section.

An insert 22 of the present invention, is shown installed in the receptacle 10, and in cases of receptacles of other cross sections, conforms closely to the inner surfaces of the sidewalls 14 of the receptacle. The illustrated insert 22 comprises a generally flat bottom wall or tray 24, of such size and shape to fit closely and slidably with the inner surface of the receptacle side walls 14. A channeled and projecting handle 26 rises from and is preferably integral with certain perimeter areas of the tray 24 and a plurality of perforations 25 are provided in the tray 24.

Figure 2:
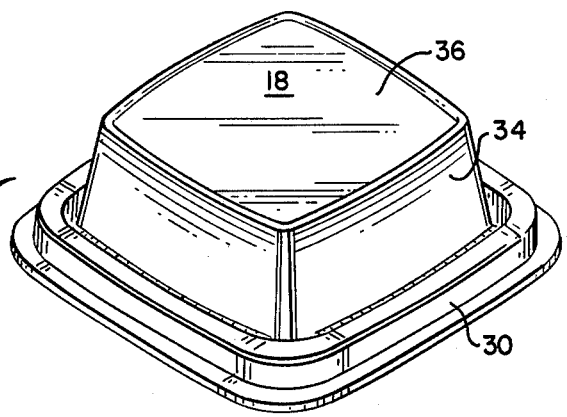
FIG. 2 is a vertical transverse section, taken through the container and its insert along line 2—2 of FIG. 1.
Figure 2:
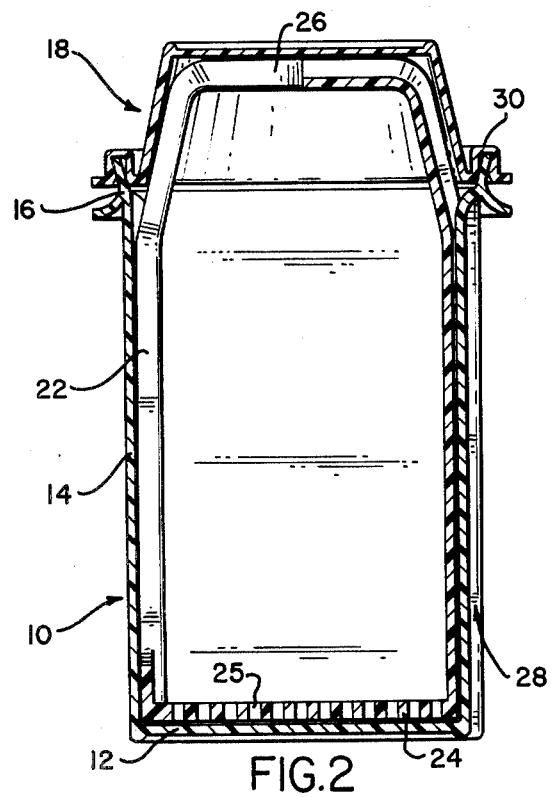
Figure 3:
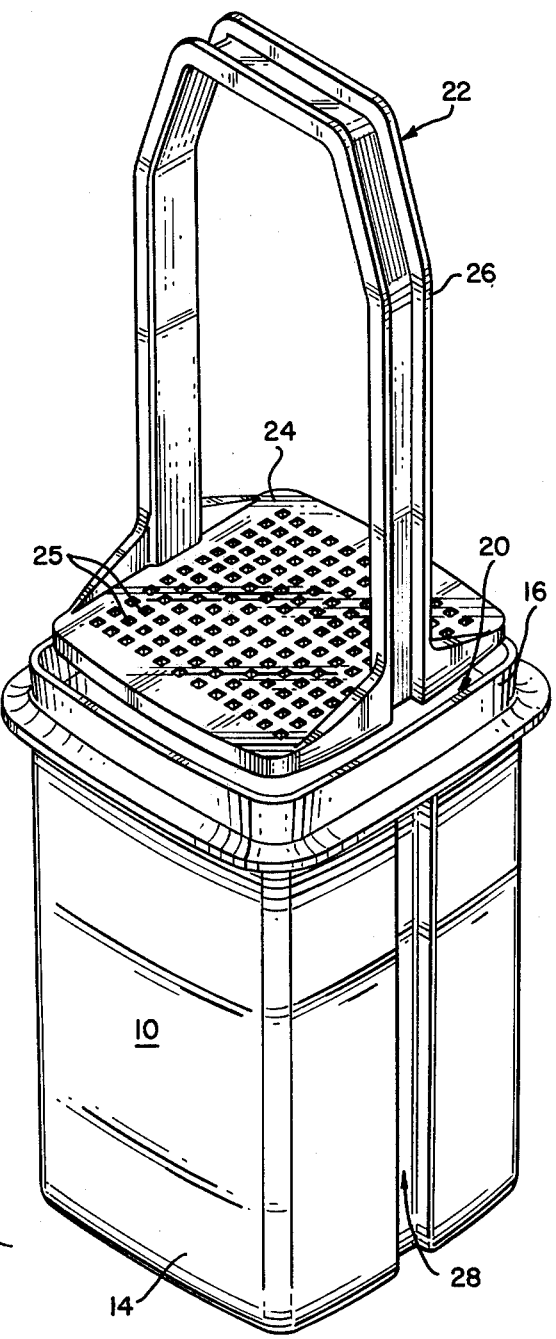
FIG. 3 is an exploded perspective view, showing the container, its closure, and the insert for the container.
Figure 4:
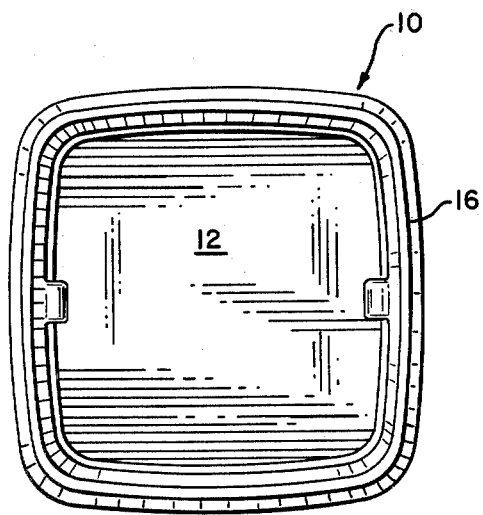
FIG. 4 is a top plan view of the container with the insert removed therefrom.
Figure 5:
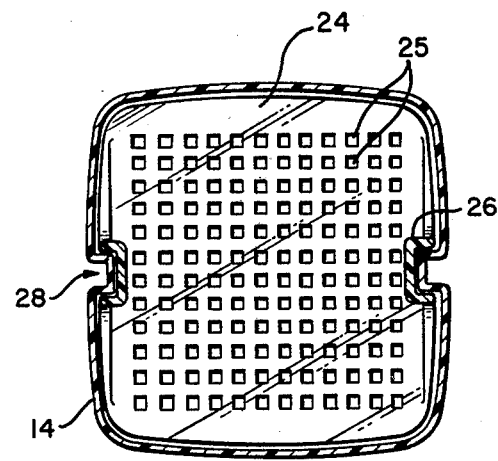
FIG. 5 is a cross-section view of the container and insert taken along line 5—5 of FIG. 1.
Figure 6:
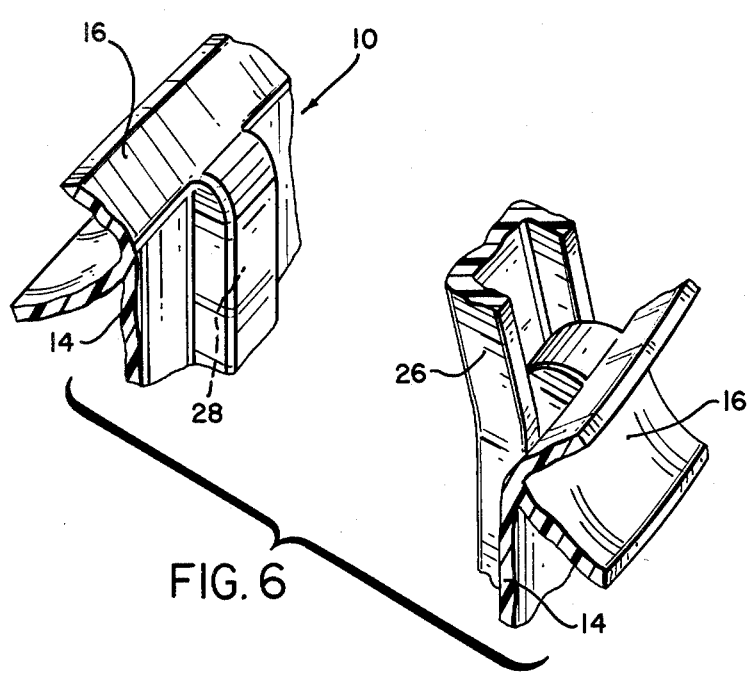
FIG. 6 is a partial enlargement of a portion of the container and insert illustrating the insert guiding arrangement.
Figure 7:
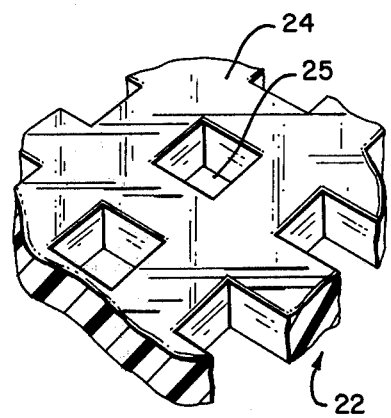
FIG. 7 is a partial enlargement of the insert tray.

As is most readily apparent from FIGS. 2, 4 and 6 two opposed ones of receptacle 10 side walls members 14 are provided with substantially vertically extending channels 28. These channels (i.e., integral guide means) are apparent as such in the exterior surfaces of the side wall members 14 and accordingly, appear as inwardly projecting indentations in the receptacle interior. Further, such channels 28 in the preferred embodiment take a generally rectangular form and extend from the bottom wall portion 12 along substantially the entirety of the side walls 14, ending adjacent the top end opening 20 of receptacle 10 at flanged rim 16.

In like manner, the channeled handle member 26 takes a generally U-shaped configuration, the span and depth of which is slightly larger than the channel indentation 28. Accordingly, such cooperate with the receptacle guide means (channels - indentations 28) during virtually the full extent of movement of insert 22 so as to positively restrain such insert in those movements within receptacle 10. This guiding means also, therefore, retains the generally flat bottom wall 24 of insert 22 in a substantially parallel relationship with receptacle bottom wall 12 during insert movements within the receptacle. This, in turn, assures that product supported upon the tray surface will be retained there during such movements and that the tray and insert cannot become otherwise misaligned so as to prevent free and easy vertical travel therein.

Even though the preferred embodiment envisions the opposed guiding system shown and described, a single such guide, or three or more guides would be equally effective. Likewise, the location thereof might vary without affecting the intended performance thereof.

As is apparent in FIG. 1 the projecting handle 26 is of greater vertical extent than receptacle side wall members 14 and, accordingly, protrudes from top end opening 20. This enables the user of the device to readily grasp insert 22 without interference from the container contents. Furthermore, in order to provide for and assure drainage of contained liquid in which the articles are stored, back into the receptacle 10, as the insert 22 is elevated, the tray 24 is formed with a plurality of spaced perforations 25.

The combined structure hereinabove discussed is completed by the seal or closure member 18 that is adapted to seal top end opening 20 of receptacle 10. Closure 18, due to the protrusion of handle 26, necessarily must be shaped to accommodate same and to achieve this end such closure is provided with a domed central area 32 which is formed by integral, interconnected walls 34 and a substantially planar center wall 36. Of course, it should be understood and appreciated that the closure might take anyone of numerous specific forms to achieve the desired effect. Likewise, as is typical of numerous such closured containers, the lower extremities of walls 34 are branded by a U-shaped sealing member 30 which mates with the container flanged rim 16 to effect a liquid tight seal.

We claim:

1. In combination a storage and serving container and including a receptacle having a plurality of generally vertically extending side wall members, an integral bottom wall portion, and a top end opening, at least one of said side wall members incorporating integral guide means, an insert positioned within said receptacle and including a tray and rigid, unitary handle projecting therefrom and affixed thereto, said tray being of the approximate size and shape of said bottom wall, said handle being of such extent to protrude from said top end opening when said bottom wall and tray are in juxtaposition and being shaped to cooperate with said guide means to enable the user to readily move the insert with respect to the receptacle while maintaining a relatively uniform parallel relationship between said tray and bottom wall, and a seal closuring said top end opening.

2. A storage and serving container according to claim 1 wherein said integral guide means is comprised of a substantially vertical channel formed in said at least one of said side wall members and inwardly projecting into the interior of said receptacle.

3. A storage and serving container according to claim 2 wherein said handle includes a channel of the same general shape and approximating but slightly larger than the size of the side wall member channel.

4. A storage and serving container according to claim 2 wherein said channel extends along substantially the entirety of the side wall member.

5. A storage and serving container according to claim 1 wherein said seal includes a domed central area adapted to accommodate the protrusion of said handle from the top end opening of the receptacle.

6. A storage and serving container according to claim 5 wherein said central area includes a plurality of integral interconnected sidewalls and a generally planar center wall member.

7. In combination a storage and serving container and including a receptacle having a generally vertically extending side wall, an integral bottom wall portion and a top end opening, said side wall incorporating opposed integral guide means, an insert positioned within said receptacle and including a tray and rigid, unitary handle projecting therefrom and affixed thereto, said tray being of the approximate size and shape of said bottom wall, said handle being of such extent to protrude from said top end opening when said bottom wall and tray are in juxtaposition and being shaped to cooperate with said guide means to enable the user to readily move the insert with respect to the receptacle while maintaining a relatively uniform parallel relationship between said tray and bottom wall, and a seal closuring said top end opening.

8. A storage and serving container according to claim 7 wherein said integral guide means is comprised of a substantially vertical channel formed in said at least one of said side wall members and inwardly projecting into the interior of said receptacle.

9. A storage and serving container according to claim 8 wherein said handle includes a channel of the same general shape and approximating but slightly larger than the size of the side wall member channel.

10. A storage and serving container according to claim 7 wherein said channel extends along substantially the entirety of the side wall member.

11. In combination a storage and serving container and including a receptacle having a plurality of generally vertically extending side wall members, an integral bottom wall portion, and a top end opening, at least one of said side wall members incorporating a substantially vertical channel inwardly projecting into the interior of said receptacle, an insert positioned within said receptacle and including a tray and rigid, unitary handle projecting therefrom and affixed thereto, said tray being of the approximate size and shape of said bottom wall, said handle being of such extent to protrude from said top end opening when said bottom wall and tray are in juxtaposition and including a channel of the same general shape and approximating but slightly larger than the size of the side wall member channel and adapted to cooperate with said channel to enable the user to readily move the insert with respect to the receptacle while maintaining a relatively uniform parallel relationship between said tray and bottom wall, and a seal for closuring said top end opening, which seal includes a domed central area adapted to accommodate the protrusion of said handle from the top end opening of the receptacle and wherein said central area includes a plurality of integral interconnected sidewalls and a generally planar center wall member.

* * * * *